United States Patent
Jun et al.

(10) Patent No.: US 11,718,738 B2
(45) Date of Patent: *Aug. 8, 2023

(54) ADHESIVE COMPOSITION INCLUDING ETHYLENE/ALPHA-OLEFIN COPOLYMER

(71) Applicant: LG Chem, Ltd., Seoul (KR)

(72) Inventors: Jung Ho Jun, Daejeon (KR); Eun Jung Lee, Daejeon (KR); Jin Sam Gong, Daejeon (KR); Rae Keun Gwak, Daejeon (KR); Tae Su Kim, Daejeon (KR)

(73) Assignee: LG Chem, Ltd.

( * ) Notice: Subject to any disclaimer, the term of this patent is extended or adjusted under 35 U.S.C. 154(b) by 341 days.

This patent is subject to a terminal disclaimer.

(21) Appl. No.: 17/050,171

(22) PCT Filed: May 3, 2019

(86) PCT No.: PCT/KR2019/005370
§ 371 (c)(1),
(2) Date: Oct. 23, 2020

(87) PCT Pub. No.: WO2019/212309
PCT Pub. Date: Nov. 7, 2019

(65) Prior Publication Data
US 2021/0230460 A1    Jul. 29, 2021

(30) Foreign Application Priority Data

May 4, 2018  (KR) ........................ 10-2018-0052045

(51) Int. Cl.
| | |
|---|---|
| C08F 210/16 | (2006.01) |
| C08L 23/08 | (2006.01) |
| C09J 123/08 | (2006.01) |
| C08F 2/38 | (2006.01) |
| C08F 4/649 | (2006.01) |
| C08F 4/6592 | (2006.01) |
| C08F 210/02 | (2006.01) |
| C08F 210/08 | (2006.01) |
| C09J 11/08 | (2006.01) |

(52) U.S. Cl.
CPC ............ *C08L 23/0815* (2013.01); *C08F 2/38* (2013.01); *C08F 4/6493* (2013.01); *C08F 4/6495* (2013.01); *C08F 4/6496* (2013.01); *C08F 4/6498* (2013.01); *C08F 4/6592* (2013.01); *C08F 210/02* (2013.01); *C08F 210/08* (2013.01); *C08F 210/16* (2013.01); *C09J 11/08* (2013.01); *C09J 123/0815* (2013.01); *C08L 2314/06* (2013.01)

(58) Field of Classification Search
CPC . C09J 123/0815; C08F 210/02; C08F 210/16; C08F 2500/29
See application file for complete search history.

(56) References Cited

U.S. PATENT DOCUMENTS

| | | | |
|---|---|---|---|
| 4,908,411 A | | 3/1990 | Kinoshita |
| 4,935,474 A | | 6/1990 | Ewen et al. |
| 5,602,223 A | | 2/1997 | Sasaki et al. |
| 5,914,289 A | | 6/1999 | Razavi |
| 6,121,402 A | | 9/2000 | Machida et al. |
| 6,828,394 B2 | | 12/2004 | Vaughan et al. |
| 6,841,631 B2 | | 1/2005 | Loveday et al. |
| 6,894,128 B2 | | 5/2005 | Loveday et al. |
| 7,439,305 B2 | * | 10/2008 | Hoffmann ............... C09J 123/02 525/240 |
| 7,799,879 B2 | * | 9/2010 | Crowther ................ C08F 10/06 502/155 |
| 8,034,878 B2 | * | 10/2011 | Karjala .................... C08F 10/00 525/240 |
| 8,173,232 B2 | * | 5/2012 | Mandare ................. B32B 27/18 428/339 |
| 8,329,848 B2 | | 12/2012 | Kajihara et al. |
| 8,372,930 B2 | * | 2/2013 | Brant ..................... C08F 210/16 526/348 |
| 8,580,902 B2 | * | 11/2013 | Crowther ............. B01J 31/0239 526/348 |
| 8,835,567 B2 | * | 9/2014 | Demirors ................ C08L 23/14 525/240 |
| 9,115,275 B2 | * | 8/2015 | Kupar .................... B65D 51/26 |
| 9,120,888 B2 | * | 9/2015 | Karjala ................. C08F 255/00 |
| 9,428,636 B2 | * | 8/2016 | Effler ..................... C08F 10/02 |

(Continued)

FOREIGN PATENT DOCUMENTS

| | | |
|---|---|---|
| CN | 101248099 A | 8/2008 |
| CN | 101466809 A | 6/2009 |

(Continued)

OTHER PUBLICATIONS

KR 20190029064 (Mar. 20, 2019); machine translation. (Year: 2019).*
Search Report dated Jul. 26, 22 from Office Action for Chinese Application No. 201980028889.5 dated Aug. 3, 2022. 3 pgs.
Search Report dated Jul. 18, 22 from Office Action for Chinese Application No. 201980015560.5 dated Jul. 22, 2022. 3 pgs.
Examination Report from Indian Office Action dated Dec. 22, 2021 for Application No. 202017037806, 2 Pages.
International Search Report for Application No. PCT/KR2019/005370 dated Aug. 14, 2019, 2 pages.
International Search Report fro PCT/KR2019/005369 dated Aug. 14, 2019; 3 pages.

(Continued)

*Primary Examiner* — Rip A Lee
(74) *Attorney, Agent, or Firm* — Lerner David LLP

(57) ABSTRACT

The present invention provides an adhesive composition including an ethylene/alpha-olefin copolymer; and a tackifier, wherein the ethylene/alpha-olefin copolymer has narrow molecular weight distribution together with a low density and an ultra low molecular weight, minimized number of unsaturated functional groups, and particularly a small amount of vinylidene among the unsaturated functional groups, thereby showing excellent physical properties.

19 Claims, No Drawings

(56) References Cited

U.S. PATENT DOCUMENTS

| | | | |
|---|---|---|---|
| 9,458,260 B2 * | 10/2016 | Canich | C08F 110/06 |
| 9,834,712 B2 * | 12/2017 | Kapur | B32B 27/36 |
| 10,829,569 B2 | 11/2020 | Hagadorn et al. | |
| 11,326,045 B2 * | 5/2022 | Mazzola | B32B 27/325 |
| 2007/0135623 A1 | 6/2007 | Voskoboynikov et al. | |
| 2008/0167421 A1 | 7/2008 | Yalvac et al. | |
| 2008/0306217 A1 | 12/2008 | Karjala | |
| 2010/0087609 A1 | 4/2010 | Park et al. | |
| 2010/0160497 A1 | 6/2010 | Karjala et al. | |
| 2011/0003940 A1 * | 1/2011 | Karjala | C08F 10/00 |
| | | | 526/348.4 |
| 2013/0085246 A1 | 4/2013 | Kum et al. | |
| 2013/0202902 A1 | 8/2013 | DeJesus et al. | |
| 2016/0257862 A1 * | 9/2016 | Yoshimoto | C09J 123/0815 |
| 2016/0326281 A1 | 11/2016 | Kim et al. | |
| 2018/0201698 A1 | 7/2018 | Hagadorn et al. | |
| 2018/0201706 A1 | 7/2018 | Park et al. | |
| 2019/0002602 A1 | 1/2019 | Patel et al. | |

FOREIGN PATENT DOCUMENTS

| | | | | |
|---|---|---|---|---|
| CN | 101679561 A | | 3/2010 | |
| CN | 102971346 A | | 3/2013 | |
| CN | 105518096 A | | 4/2016 | |
| CN | 106661142 A | | 5/2017 | |
| EP | 0183493 A2 | | 6/1986 | |
| EP | 1969022 B1 | | 3/2011 | |
| EP | 2407496 A1 | | 1/2012 | |
| EP | 3059291 A1 | | 8/2016 | |
| EP | 3205698 A1 | | 8/2017 | |
| EP | 3257879 A1 | | 12/2017 | |
| JP | 2009500513 A | | 1/2009 | |
| JP | 2009540108 A | | 11/2009 | |
| JP | 2014508848 A | | 4/2014 | |
| JP | 2016056337 A | | 4/2016 | |
| JP | 2018525507 A | | 9/2018 | |
| KR | 20040076965 A | | 9/2004 | |
| KR | 20090031355 A | | 3/2009 | |
| KR | 101097378 B1 | | 12/2011 | |
| KR | 20140019351 A | | 2/2014 | |
| KR | 20160054849 A | | 5/2016 | |
| KR | 20170067499 A | | 6/2017 | |
| KR | 20170073385 A | | 6/2017 | |
| KR | 20190029064 A | * | 3/2019 | C08F 210/16 |
| WO | 2012134715 A2 | | 10/2012 | |
| WO | 2015056787 A1 | | 4/2015 | |
| WO | 2017039993 A1 | | 3/2017 | |
| WO | 2017-139096 A1 | | 8/2017 | |

OTHER PUBLICATIONS

Kim JY, Yoon SY, Yang YD, Noh SK. Production of Polyethylene Wax via Metallocene Catalysts [(TMDS) Cp2] ZrCl2 and [(n-Bu)2Cp2] ZrCl2 in the Presence of Hydrogen Gas as a Chain Transfer Reagent. Polymer Korea. Accepted Aug. 25, 2008;32(6):566-72.

Extended European Search Report including Written Opinion for Application No. EP19795998.4 dated Mar. 17, 2021, 6 pages.

Yiyong He et al., "Terminal and Internal Unsaturations in Poly(ethylene-co-1-octene)", Macromolecules, Jun. 16, 2014, pp. 3782-3790, vol. 47, No. 12.

Extended European Search Report including Written Opinion for Application No. EP19795991.9 dated Jun. 24, 2021, 9 pages.

\* cited by examiner

ADHESIVE COMPOSITION INCLUDING ETHYLENE/ALPHA-OLEFIN COPOLYMER

CROSS-REFERENCE TO RELATED APPLICATIONS

The present application is a national phase entry under 35 U.S.C. § 371 of International Application No. PCT/KR2019/005370 filed May 3, 2019, which claims priority from Korean Patent Application No. 10-2018-0052045 filed May 4, 2018, all of which are incorporated herein by reference.

TECHNICAL FIELD

The present invention relates to an adhesive composition including an ethylene/alpha-olefin copolymer, and an article including the same.

BACKGROUND ART

Olefin polymerization catalyst systems may be classified into a Ziegler-Natta and metallocene catalyst systems, and these two highly active catalyst systems have been developed in accordance with the characteristics of each. The Ziegler-Natta catalyst has been widely applied in a commercial process since its invention in the 1950s, but is a multi-site catalyst in which many active sites are coexist and has the characteristics of broad molecular weight distribution of a polymer, in addition, since the composition distribution of a comonomer is nonuniform, there are limitations in securing desired physical properties.

Meanwhile, the metallocene catalyst is composed of the combination of a main catalyst having a transition metal compound as a main component and a promoter which is an organometal compound having aluminum as a main component, and such catalyst is a homogeneous complex catalyst and is a single site catalyst. According to the single site properties, a polymer having narrow molecular weight distribution and uniform composition distribution of a comonomer is obtained, and according to the structural deformation of the ligand of a catalyst and polymerization conditions, the steric regularity, copolymerization properties, molecular weight, crystallinity, etc. of a polymer may be changed.

U.S. Pat. No. 5,914,289 discloses a method of controlling the molecular weight and molecular weight distribution of a polymer using metallocene catalysts supported by individual supports, but the amount of a solvent used for preparing a supported catalyst and preparation time are consumed a lot, and there is inconvenience to support the metallocene catalysts used on individual supports.

Korean Patent Application No. 10-2003-0012308 discloses a method of controlling molecular weight distribution by supporting a dinuclear metallocene catalyst and a mononuclear metallocene catalyst together with an activator on a support and polymerizing while changing the combination of the catalysts in a reactor. However, such method has limitations in accomplishing the properties of individual catalysts at the same time, and a metallocene catalyst part is separated from a support component of a completed catalyst, thereby inducing fouling in a reactor.

Meanwhile, a linear low-density polyethylene is prepared by copolymerizing ethylene and alpha olefin using a polymerization catalyst at a low pressure, and is a resin having narrow molecular weight distribution and a short chain branch with a certain length without a long chain branch. A linear low-density polyethylene film has the properties of a common polyethylene, high breaking strength and elongation, and excellent tearing strength and falling weight impact strength, and thus, is increasingly used in a stretch film, an overlap film, etc., to which the conventional low-density polyethylene or high-density polyethylene is difficult to apply.

However, most linear low-density polyethylene using 1-butene or 1-hexene as a comonomer is prepared in a single gas phase reactor or a single loop slurry reactor, and has higher productivity when compared with a process using a 1-octene comonomer. However, the properties of such a product also are greatly inferior to a case using a 1-octene comonomer due to the limitations of catalyst technology used and process technology used, and the molecular weight distribution thereof is narrow, and thus, processability is poor.

U.S. Pat. No. 4,935,474 reports a method of preparing polyethylene having broad molecular weight distribution by using two or more metallocene compounds. U.S. Pat. No. 6,828,394 reports a method of preparing polyethylene having excellent processability and which is particularly suitable as a film, by mixing a comonomer having good bonding properties and a comonomer without them. In addition, U.S. Pat. Nos. 6,841,631 and 6,894,128 indicate that polyethylene having bimodal or multimodal molecular weight distribution is prepared by using a metallocene catalyst in which at least two kinds of metal compounds are used, and is applicable to the use of a film, a blow molding, a pipe, etc. However, such products have improved processability but a nonuniform dispersion state by the molecular weight in a unit particle, and extrusion appearance is rough and physical properties are unstable though under relatively good extrusion conditions.

In such a background, the preparation of an excellent product making balance between physical properties and processability is continuously required.

DISCLOSURE OF THE INVENTION

Technical Problem

Accordingly, the present invention is for solving the above-described limitations of the conventional art, and providing an adhesive composition showing excellent physical properties, particularly low viscosity change rate after storing for a long time and excellent long-period physical properties, showing a little discoloration at a high temperature, and having excellent stability at a high temperature, by including an ethylene/alpha-olefin copolymer having narrow molecular weight distribution, a small number of unsaturated functional groups and $R_{vd}$ value.

Technical Solution

In order to solve the above tasks, according to an embodiment of the present invention, there is provided an adhesive composition including an ethylene/alpha-olefin copolymer; and a tackifier, wherein the ethylene/alpha-olefin copolymer satisfies the following conditions i) to iv):

i) viscosity: 6,000 cP to 40,000 cP, if measured at a temperature of 180° C., ii) molecular weight distribution (MWD): 1.5 to 3.0, iii) total number of unsaturated functional groups per 1000 carbon atoms: 0.8 or less, and iv) a $R_{vd}$ value according to the following Mathematical Equation 1: 0.5 or less:

$$R_{vd} = \frac{[\text{vinylidene}]}{[\text{vinyl}] + [\text{vinylene}] + [\text{vinylidene}]} \quad \text{[Mathematical Equation 1]}$$

(in Mathematical Equation 1, vinyl, vinylene and vinylidene mean the number of each functional group per 1000 carbon atoms, measured through nuclear magnetic spectroscopic analysis).

Advantageous Effects

The adhesive composition according to the present invention includes an ethylene/alpha-olefin copolymer having a low density, an ultra low molecular weight, narrow molecular weight distribution, a small number of unsaturated functional groups in a polymer and a small amount ratio of vinylidene, thereby showing a little viscosity change rate according to time, excellent long-period properties, a little heat resistant discoloration degree after standing at a high temperature, and improved stability at a high temperature. Accordingly, the present invention may provide an adhesive composition having excellent long-period properties and stability at a high temperature.

BEST MODE FOR CARRYING OUT THE INVENTION

The terminology used herein is for the purpose of describing particular example embodiments only and is not intended to limit the present invention. The singular forms are intended to include the plural forms as well, unless the context clearly indicates otherwise. It will be understood that the terms "comprise" and/or "comprising," when used in this specification, specify the presence of stated features, steps, elements or the combination thereof, but do not preclude the presence or addition of one or more other features, steps, elements or the combination thereof.

The present invention may have various changes and be embodied in various forms, and specific embodiments are illustrated and will be explained in detail below. However, it should be understood that the present invention is not limited to a specific disclosure type, but includes all changes, equivalents and substituents included in the scope and technical range of the present invention.

1. Adhesive Composition

An embodiment of the present invention provides an adhesive composition including an ethylene/alpha-olefin copolymer; and a tackifier, wherein the ethylene/alpha-olefin copolymer satisfies the following conditions i) to iv):

i) viscosity: 4,000 cP to 50,000 cP, if measured at a temperature of 180° C., ii) molecular weight distribution (MWD): 1.5 to 3.0, iii) total number of unsaturated functional groups per 1000 carbon atoms: 0.8 or less, and iv) a $R_{vd}$ value according to the following Mathematical Equation 1: 0.5 or less:

$$R_{vd} = \frac{[\text{vinylidene}]}{[\text{vinyl}] + [\text{vinylene}] + [\text{vinylidene}]} \quad \text{[Mathematical Equation 1]}$$

(in Mathematical Equation 1, vinyl, vinylene and vinylidene mean the number of each functional group per 1000 carbon atoms, measured through nuclear magnetic spectroscopic analysis)

The adhesive composition of the present invention includes an ethylene/alpha-olefin copolymer having a low density, an ultra low molecular weight, narrow molecular weight distribution, a small number of unsaturated functional groups in a polymer, and a small ratio of vinylidene, thereby showing excellent long-period properties and adhesive properties.

Hereinafter, the ethylene/alpha-olefin copolymer and a method for preparing the same will be described first in detail.

(1) Ethylene/Alpha-Olefin Copolymer

An ethylene/alpha-olefin copolymer used in an adhesive composition of the present invention satisfies the following conditions i) to iv):

i) viscosity: 4,000 cP to 50,000 cP, if measured at a temperature of 180° C., ii) molecular weight distribution (MWD): 1.5 to 3.0, iii) total number of unsaturated functional groups per 1000 carbon atoms: 0.8 or less, and iv) a $R_{vd}$ value according to the following Mathematical Equation 1: 0.5 or less:

$$R_{vd} = \frac{[\text{vinylidene}]}{[\text{vinyl}] + [\text{vinylene}] + [\text{vinylidene}]} \quad \text{[Mathematical Equation 1]}$$

(in Mathematical Equation 1, vinyl, vinylene and vinylidene mean the number of each functional group per 1000 carbon atoms, measured through nuclear magnetic spectroscopic analysis)

The crosslinking between copolymers is carried out by vinyl and vinylidene, including double bonds, and in the ethylene/alpha-olefin copolymer, the number of unsaturated functional groups in a copolymer may decrease, particularly, the ratio of vinylidene may decrease, particularly, the number of the unsaturated functional groups and $R_{vd}$ conditions may be satisfied through the injection of an optimized amount of hydrogen together with a catalyst which will be explained later during polymerization, thereby showing excellent stability at a high temperature with decreased discoloration, molecular weight and viscosity change rate at a high temperature.

The ethylene/alpha-olefin copolymer of the present invention has a viscosity of 50,000 cP or less if measured at 180° C. in conditions satisfying low density properties as described above. More particularly, the viscosity of the ethylene/alpha-olefin copolymer may be 40,000 cP or less, 37,000 cP or less, or 35,000 cP or less, and 4,000 cP or more, or 6,000 cP or more, or 7,000 cP or more, or 8,500 cP or more.

Particularly, the ethylene/alpha-olefin copolymer may have a number of unsaturated functional groups including vinyl, vinylene and vinylidene of 0.8 or less per 1000 carbon atoms in the copolymer, more particularly, 0.6 or less, or 0.5 or less, or 0.45 or less, or 0.40 or less, and 0.1 or more, or 0.2 or more or 0.23 or more.

In addition, the ethylene/alpha-olefin copolymer may have a $R_{vd}$ value calculated according to Mathematical Equation 1 of 0.5 or less, more particularly, 0.3 or less, or 0.25 or less, or 0.22 or less, and greater than 0, or 0.1 or more, or 0.15 or more.

In the present invention, the amounts (or numbers) of the vinyl, vinylene and vinylidene as the unsaturated functional groups in the copolymer may be calculated from nuclear magnetic resonance (NMR) analysis results. Particularly, the copolymer is dissolved in a chloroform-d (w/TMS) solution, and measurement is performed 16 times at room temperature with an acquisition time of 2 seconds and a pulse angle of 45°, using an Agilent 500 MHz NMR equipment. Then, the TMS peak in 1H NMR is calibrated to 0 ppm, a $CH_3$-related peak (triplet) of 1-octene at 0.88 ppm and a $CH_2$-related peak (broad singlet) of ethylene at 1.26 ppm are confirmed, respectively, and an integration value of the $CH_3$ peak is calibrated to 3 to calculate the contents. In addition, each number could be calculated based on the integration values of the vinyl, vinylene and vinylidene in 4.5-6.0 ppm region.

In addition, generally, in case of polymerizing two or more kinds of monomers, molecular weight distribution (MWD) increases, and as a result, impact strength and mechanical properties may decrease and blocking phenomenon, etc. may arise. About this, in the present invention, an optimal amount of hydrogen may be injected during carrying out polymerization reaction, and the molecular weight and molecular weight distribution of the ethylene/alpha-olefin copolymer thus prepared may be decreased, and as a result, impact strength, mechanical properties, etc. may be improved.

In addition, the ethylene/alpha-olefin copolymer of the present invention has a density additionally measured according to ASTM D-792 of 0.85 g/cc to 0.89 g/cc in conditions satisfying the above-described physical properties. Particularly, the density may be 0.855 g/cc or more, or 0.86 g/cc or more, or 0.865 g/cc or more, and 0.89 g/cc or less, or 0.885 g/cc or less, or 0.880 g/cc or less.

Generally, the density of an olefin-based polymer is influenced by the kind and amount of a monomer used during polymerization, a polymerization degree, etc., and a copolymer may be largely influenced by the amount of a comonomer. With the increase of the comonomer, an ethylene/alpha-olefin copolymer having a low density may be prepared, and the amount of the comonomer capable of being introduced into a copolymer may be dependent on the copolymerization properties of a catalyst, that is, the properties of the catalyst.

In the present invention, a large amount of a comonomer may be introduced due to the use of a catalyst composition including a transition metal compound having a specific structure. As a result, the ethylene/alpha-olefin copolymer of the present invention may have a low density as described above, and as a result, excellent processability may be shown. More particularly, the ethylene/alpha-olefin copolymer may preferably have a density of 0.860 g/cc to 0.885 g/cc, more preferably, a density of 0.865 g/cc to 0.880 g/cc, and in this case, the maintenance of mechanical properties and the improving effects of impact strength according to the control of the density are even more remarkable.

In addition, the ethylene/alpha-olefin copolymer of the present invention has molecular weight distribution (MWD) of 1.5 to 3.0. Particularly, the molecular weight distribution may be 2.5 or less, more particularly, 1.7 or more, or 1.8 or more, or 1.9 or more and 2.3 or less, or 2.1 or less, or 2.0 or less.

Meanwhile, in the present invention, the weight average molecular weight (Mw) and number average molecular weight (Mn) are polystyrene conversion molecular weights which are analyzed by gel permeation chromatography (GPC), and the molecular weight distribution may be calculated from the ratio of Mw/Mn.

The ethylene/alpha-olefin copolymer may be a polymer with an ultra low molecular weight, which has a weight average molecular weight (Mw) of 15,000 to 45,000 g/mol. More particularly, the weight average molecular weight may be 17,000 g/mol or more, or 19,000 g/mol or more, and 40,000 g/mol or less, or 37,000 g/mol or less, or 35,000 g/mol or less.

Also, the ethylene/alpha-olefin copolymer may have a melt index (MI) of 200 to 1,300 dg/min. Particularly, the melt index may be 400 dg/min or more, 500 dg/min or more, and 1,200 dg/min or less, 1,000 dg/min or less. The melt index (MI) is a value measured according to ASTM D-1238 (Condition E, 190° C., 2.16 kg load).

If the weight average molecular weight and the melt index satisfy the above-described ranges, remarkable improvement of processability may be expected in connection with the viscosity of the adhesive composition including the same. That is, the mechanical properties and impact strength of the ethylene/alpha-olefin copolymer, and the viscosity may be controlled by controlling the kind of a catalyst used and the amount of the catalyst used during polymerization, and by satisfying a viscosity range along with the above-described conditions, improved processability may be shown while keeping excellent mechanical properties.

In addition, the ethylene/alpha-olefin copolymer of the present invention may have a number average molecular weight (Mn) of 5,000 to 35,000. More particularly, the number average molecular weight may be 7,000 or more, or 8,000 or more, or 9,000 or more, and 30,000 or less, or 25,000 or less.

In addition, the ethylene/alpha-olefin copolymer of the present invention may have a crystallization temperature (Tc) of 45° C. or more. More particularly, the crystallization temperature may be 50° C. or more, or 51° C. or more, and 60° C. or less, or 58° C. or less, or 56° C. or less. The high crystallization temperature as described above is due to the uniform distribution of a comonomer in the ethylene/alpha-olefin copolymer, and with the temperature range, excellent structural stability may be shown.

In addition, the ethylene/alpha-olefin copolymer of the present invention may have a melting temperature (Tm) of 60 to 80° C. More particularly, the melting temperature may be 65° C. or more, or 69° C. or more, or 70° C. or more, and 75° C. or less, or 74.5° C. or less, or 74° C. or less. With the melting temperature in the temperature range as described above, excellent thermal stability may be shown.

In the present invention, the crystallization temperature and melting temperature of the ethylene/alpha-olefin copolymer may be measured using a differential scanning calorimeter (DSC). Particularly, the copolymer is heated to 150° C., kept for 5 minutes, and cooled to 20° C. again, and then, the temperature is elevated again. In this case, the elevating rate and decreasing rate of the temperature are controlled to 10° C./min, respectively, and the results measured in a section where the temperature is secondly elevated is set to the melting temperature, and the results measured in a section where the temperature is decreased is set to the crystallization temperature.

In addition, in the ethylene/alpha-olefin copolymer of the present invention, the alpha-olefin-based monomer which is the comonomer may be an olefin-based monomer of 4 to 20 carbon atoms. Particular example may include propylene, 1-butene, 1-pentene, 4-methyl-1-pentene, 1-hexene, 1-heptene, 1-octene, 1-decene, 1-undecene, 1-dodecene, 1-tetradecene, 1-hexadecene, or 1-eicocene, and these may be used alone or as a mixture of two or more.

Among them, the alpha-olefin monomer may be 1-butene, 1-hexene or 1-octene considering the remarkable improving effects if applied to an adhesive composition, and most preferably, 1-octene may be used.

In addition, in the ethylene/alpha-olefin copolymer, the amount of the alpha-olefin which is a comonomer may be appropriately selected from a range satisfying the above-described physical property conditions, and may be particularly greater than 0 and 99 mol % or less, or 10 to 50 mol %.

An ethylene/alpha-olefin copolymer of the present invention may satisfy the following conditions i) to vii):

i) viscosity: 4,000 cP to 50,000 cP, if measured at a temperature of 180° C., ii) density: 0.85 to 0.89 g/cc, iii) molecular weight distribution (MWD): 1.5 to 3.0, iv) total number of unsaturated functional groups per 1000 carbon atoms: 0.8 or less, v) a number average molecular weight (Mn): 9,000 to 25,000, vi) melt index (MI) at 190° C., 2.16 kg load by ASTM D1238: 200 to 1,300 dg/min, and vii) a $R_{vd}$ value according to the following Mathematical Equation 1: 0.5 or less:

$$R_{vd} = \frac{[\text{vinylidene}]}{[\text{vinyl}] + [\text{vinylene}] + [\text{vinylidene}]} \quad [\text{Mathematical Equation 1}]$$

(in Mathematical Equation 1, vinyl, vinylene and vinylidene mean the number of each functional group per 1000 carbon atoms, measured through nuclear magnetic spectroscopic analysis)

The copolymer described above may accomplish the effects described above, and may have a small number of total unsaturated functional groups and a small amount ratio of vinylidene, and thus, improvement of effects such as long-period stability may be expected.

(2) Method for Preparing Ethylene/Alpha-Olefin Copolymer

The ethylene/alpha-olefin copolymer having the above-described physical properties may be prepared by a preparation method including a step of polymerizing ethylene and an alpha-olefin-based monomer by injecting hydrogen in 45 to 100 cc/min in the presence of a catalyst composition including a transition metal compound of the following Formula 1:

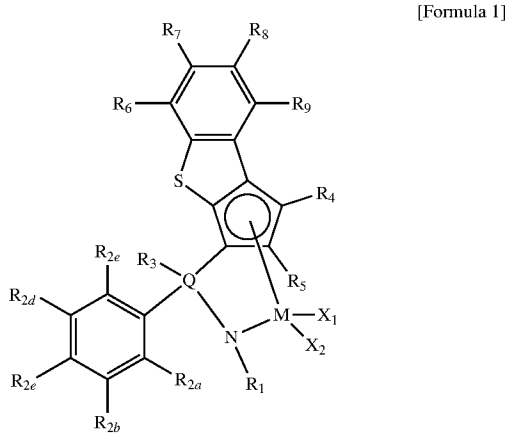

[Formula 1]

In Formula 1, $R_1$ is hydrogen; alkyl of 1 to 20 carbon atoms; cycloalkyl of 3 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, $R_{2a}$ to $R_{2e}$ are each independently hydrogen; halogen; alkyl of 1 to 20 carbon atoms; cycloalkyl of 3 to 20 carbon atoms; alkenyl of 2 to 20 carbon atoms; alkoxy of 1 to 20 carbon atoms; or aryl of 6 to 20 carbon atoms, $R_3$ is hydrogen; halogen; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkyl amido of 1 to 20 carbon atoms; aryl amido of 6 to 20 carbon atoms; or phenyl which is substituted with one or more selected from the group consisting of halogen, alkyl of 1 to 20 carbon atoms, cycloalkyl of 3 to 20 carbon atoms, alkenyl of 2 to 20 carbon atoms, alkoxy of 1 to 20 carbon atoms and aryl of 6 to 20 carbon atoms, $R_4$ to $R_9$ are each independently hydrogen; silyl; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; or a metalloid radical of a metal in group 14 which is substituted with hydrocarbyl of 1 to 20 carbon atoms; where among the $R_6$ to $R_9$, adjacent two or more may be connected with each other to form a ring, Q is Si or C, M is a transition metal in group 4, and $X_1$ and $X_2$ are each independently hydrogen; halogen; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkylamino of 1 to 20 carbon atoms; or arylamino of 6 to 20 carbon atoms.

In case of including the transition metal compound having the structure of Formula 1 above in a catalyst composition and polymerizing ethylene and an alpha-olefin-based comonomer together with hydrogen, an ethylene/alpha-olefin copolymer having a low density and an ultra low molecular weight may be prepared as described above. Since this ethylene/alpha-olefin copolymer has the total number of unsaturated functional groups per 1,000 carbon atoms of 0.8 or less and satisfies the $R_{vd}$ value of 0.5 or less, excellent stability at a high temperature including small discoloration, and small change rate of molecular weight and viscosity at a high temperature may be shown.

That is, the crosslinking reaction which may be carried out by an unsaturated functional group and an alkyl radical in a copolymer is dominant in vinyl or vinylidene, which has relatively not much steric hindrance among the unsaturated functional groups, viscosity may be largely changed with the progress of the crosslinking reaction, processability may be adversely affected, and as a result, the stability at a high temperature may be deteriorated. However, by applying the preparation method in the present invention, the amount ratio of the vinylidene among the unsaturated functional groups may be decreased, and thus, the crosslinking reaction may not arise well, and at last, a copolymer having a little viscosity change rate at a high temperature may be achieved. Accordingly, an adhesive composition including the copolymer has excellent long-period properties and adhesive properties.

The substituents in Formula 1 will be explained more particularly as follows.

$R_1$ may be hydrogen; alkyl of 1 to 20 carbon atoms; cycloalkyl of 3 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms.

Particularly, $R_1$ may be hydrogen; alkyl of 1 to 12 carbon atoms; cycloalkyl of 3 to 12 carbon atoms; alkoxy of 1 to 12 carbon atoms; aryl of 6 to 12 carbon atoms; arylalkoxy of 7 to 13 carbon atoms; alkylaryl of 7 to 13 carbon atoms; or arylalkyl of 7 to 13 carbon atoms.

More particularly, $R_1$ may be hydrogen or alkyl of 1 to 12 carbon atoms.

$R_{2a}$ to $R_{2e}$ may be each independently hydrogen; halogen; alkyl of 1 to 12 carbon atoms; cycloalkyl of 3 to 12 carbon atoms; alkenyl of 2 to 12 carbon atoms; alkoxy of 1 to 12 carbon atoms; or phenyl.

Particularly, $R_{2a}$ to $R_{2e}$ may be each independently hydrogen; halogen; alkyl of 1 to 12 carbon atoms; cycloalkyl of 3 to 12 carbon atoms; alkenyl of 2 to 12 carbon atoms; alkoxy of 1 to 12 carbon atoms; or phenyl.

More particularly, $R_{2a}$ to $R_{2e}$ may be each independently hydrogen; alkyl of 1 to 12 carbon atoms; or alkoxy of 1 to 12 carbon atoms.

$R_3$ may be hydrogen; halogen; alkyl of 1 to 12 carbon atoms; cycloalkyl of 3 to 12 carbon atoms; alkenyl of 2 to 12 carbon atoms; aryl of 6 to 20 carbon atoms; alkylaryl of 7 to 13 carbon atoms; arylalkyl of 7 to 13 carbon atoms; or phenyl which is substituted with one or more selected from the group consisting of halogen, alkyl of 1 to 12 carbon atoms, cycloalkyl of 3 to 12 carbon atoms, alkenyl of 2 to 12 carbon atoms, alkoxy of 1 to 12 carbon atoms and phenyl.

Particularly, $R_3$ may be hydrogen; halogen; alkyl of 1 to 12 carbon atoms; cycloalkyl of 3 to 12 carbon atoms; alkenyl of 2 to 12 carbon atoms; alkylaryl of 7 to 13 carbon atoms; arylalkyl of 7 to 13 carbon atoms; phenyl; or phenyl which is substituted with one or more selected from the group consisting of halogen, alkyl of 1 to 12 carbon atoms, cycloalkyl of 3 to 12 carbon atoms, alkenyl of 2 to 12 carbon atoms, alkoxy of 1 to 12 carbon atoms and phenyl.

More particularly, $R_3$ may be hydrogen; alkyl of 1 to 12 carbon atoms; or phenyl.

$R_4$ to $R_9$ may be each independently hydrogen; alkyl of 1 to 20 carbon atoms; cycloalkyl of 3 to 20 carbon atoms; aryl of 6 to 20 carbon atoms; alkylaryl of 7 to 20 carbon atoms; or arylalkyl of 7 to 20 carbon atoms.

Particularly, $R_4$ to $R_9$ may be each independently hydrogen; alkyl of 1 to 12 carbon atoms; cycloalkyl of 3 to 12 carbon atoms; aryl of 6 to 12 carbon atoms; alkylaryl of 7 to 13 carbon atoms; or arylalkyl of 7 to 13 carbon atoms.

More particularly, $R_4$ to $R_5$ may be each independently hydrogen; or alkyl of 1 to 12 carbon atoms, and among the $R_6$ to $R_9$, adjacent two or more may be connected with each other to form an aliphatic ring of 5 to 20 carbon atoms or an aromatic ring of 6 to 20 carbon atoms; and the aliphatic ring or the aromatic ring may be substituted with halogen, alkyl of 1 to 20 carbon atoms, alkenyl of 2 to 12 carbon atoms, or aryl of 6 to 12 carbon atoms.

Particularly, among the $R_6$ to $R_9$, adjacent two or more may be connected with each other to form an aliphatic ring of 5 to 12 carbon atoms or an aromatic ring of 6 to 12 carbon atoms; and the aliphatic ring or the aromatic ring may be substituted with halogen, alkyl of 1 to 12 carbon atoms, alkenyl of 2 to 12 carbon atoms, or aryl of 6 to 12 carbon atoms.

More particularly, $R_6$ to $R_9$ may be each independently hydrogen or methyl.

In addition, Q may be Si, and M may be Ti.

$X_1$ and $X_2$ may be each independently hydrogen; halogen; alkyl of 1 to 12 carbon atoms; cycloalkyl of 3 to 12 carbon atoms; alkenyl of 2 to 12 carbon atoms; aryl of 6 to 12 carbon atoms; alkylaryl of 7 to 13 carbon atoms; arylalkyl of 7 to 13 carbon atoms; alkylamino of 1 to 13 carbon atoms; or arylamino of 6 to 12 carbon atoms.

Particularly, $X_1$ and $X_2$ may be each independently hydrogen; halogen; alkyl of 1 to 12 carbon atoms; or alkenyl of 2 to 12 carbon atoms.

More particularly, $X_1$ and $X_2$ may be each independently hydrogen; or alkyl of 1 to 12 carbon atoms.

The transition metal compound of Formula 1 forms a structure in which cyclopentadiene fused with benzothiophene via a cyclic type bond, and an amido group ((N-Rd are stably crosslinked by Q (Si, C, N or P), and a transition metal in group 4 makes a coordination bond. If the catalyst composition is applied for polymerizing an olefin, a polyolefin having high activity, a high molecular weight and properties such as a high copolymerization degree at a high polymerization temperature may be produced.

Further, in the transition metal compound of Formula 1, as the amido group (N-Rd is crosslinked by Q (Si, C), since Q is bonded to a substituted or unsubstituted phenyl group, more stable crosslinking may be achieved and electronically excellent stability may be achieved if making coordination bond with a transition metal.

Since the transition metal compound having the above-described structure has excellent copolymerization properties due to the phenyl group, a copolymer having a low density may be prepared with a smaller amount of a comonomer with respect to a catalyst which has not a core structure like the transition metal compound of Formula 1, and at the same time, since a molecular weight degree is excellent and polymerization at a high temperature is possible, there are advantages of injecting hydrogen stably.

That is, the transition metal compound is used but an optimized amount of hydrogen is injected during polymerization reaction in the present invention, and thus, an ethylene/alpha-olefin copolymer having an ultra low molecular weight, narrow molecular weight distribution and uniform comonomer distribution may be provided. Due to the electronic/structural stability of the transition metal compound, the inclusion of hydrogen is advantageous. Accordingly, termination reaction is performed uniformly in polymerization reaction due to hydrogen, and effects of preparing a copolymer having narrow molecular weight distribution and an ultra low molecular weight may be achieved. By using such ethylene/alpha-olefin copolymer, an adhesive composition having excellent long-period properties and adhesive properties may be provided.

Even further particularly, particular examples of the compound of Formula 1 may include a compound represented by any one among the structures below, but the present invention is not limited thereto.

[Formula 1-1]
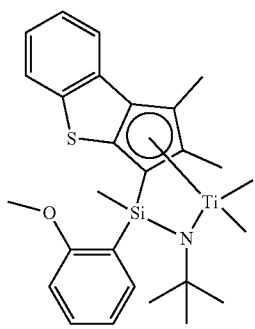
[Formula 1-2]
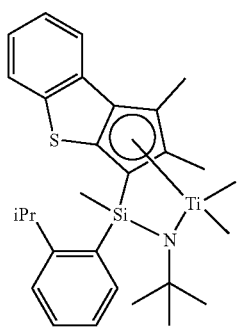
[Formula 1-3]
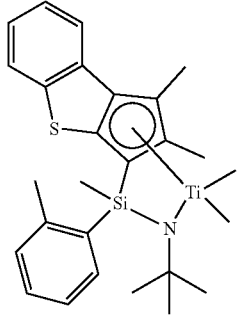
[Formula 1-4]
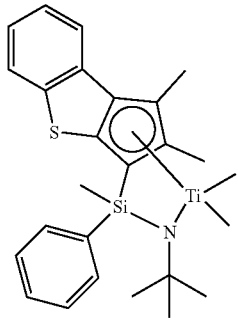
[Formula 1-5]
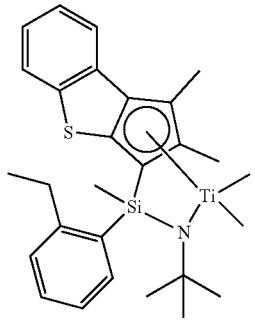
[Formula 1-6]
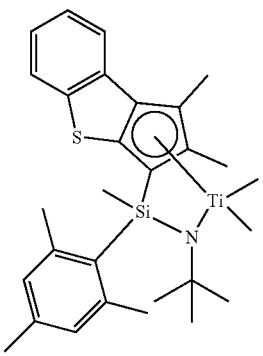
[Formula 1-7]
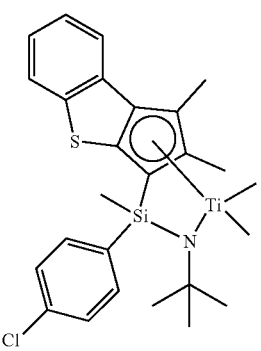
[Formula 1-8]
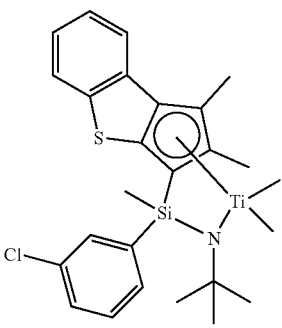
[Formula 1-9]
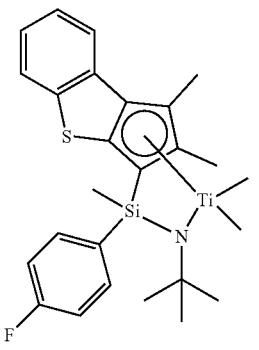

-continued

[Formula 1-10]

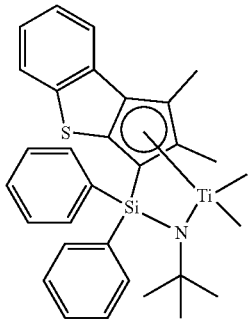

Meanwhile, in the preparation of the ethylene/alpha-olefin copolymer of the present invention, the catalyst composition may further include a promoter for activating the transition metal compound of Formula 1 above.

The promoter is an organometal compound including a metal in group 13, and particularly may include one or more among a compound of the following Formula 2, a compound of the following Formula 3, and a compound of the following Formula 4:

$$R_{41}-[Al(R_{42})-O]_n-R_{43} \quad \text{[Formula 2]}$$

in Formula 2, $R_{41}$, $R_{42}$ and $R_{43}$ are each independently any one among hydrogen, halogen, a hydrocarbyl group of 1 to 20 carbon atoms, and a halogen-substituted hydrocarbyl group of 1 to 20 carbon atoms, and n is an integer of 2 or more, $$D(R_{44})_3 \quad \text{[Formula 3]}$$

in Formula 3, D is aluminum or boron, and each $R_{44}$ is each independently any one among halogen, a hydrocarbyl group of 1 to 20 carbon atoms, and a halogen-substituted hydrocarbyl group of 1 to 20 carbon atoms, $$[L\text{-}H]^+[Z(A)_4]^- \text{ or } [L]^+[Z(A)_4]^- \quad \text{[Formula 4]}$$

in Formula 4,

L is a neutral or cationic Lewis acid; H is a hydrogen atom, and

Z is an element in group 13, and A is each independently a hydrocarbyl group of 1 to 20 carbon atoms; a hydrocarbyloxy group of 1 to 20 carbon atoms; and any one among substituents of which one or more hydrogen atoms are substituted with one or more substituents among halogen, a hydrocarbyloxy group of 1 to 20 carbon atoms, and a hydrocarbylsilyl group of 1 to 20 carbon atoms.

More particularly, the compound of Formula 2 may be an alkylaluminoxane-based compound in which repeating units are combined into a linear, circular or network type, and particular examples may include methylaluminoxane (MAO), ethylaluminoxane, isobutylaluminoxane or tert-butylalminoxane.

In addition, particular examples of the compound of Formula 3 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron or tributylboron, and particularly, may be selected from trimethylaluminum, triethylaluminum or triisobutylaluminum.

In addition, the compound of Formula 4 may include a trisubstituted ammonium salt, dialkyl ammonium salt, or trisubstituted phosphonium type borate-based compound. More particular examples may include a trisubstituted ammonium salt type borate-based compound such as trimethylammonium tetraphenylborate, methyldioctadecylammonium tetraphenylborate, triethylammonium tetraphenylborate, tripropylammonium tetraphenylborate, tri(n-butyl)ammonium tetraphenylborate, methyltetradecyloctadecylammonium tetraphenylborate, N,N-dimethylanilium tetraphenylborate, N,N-diethylanilium tetraphenylborate, N,N-dimethyl(2,4,6-trimethylanilium)tetraphenylborate, trimethylammonium tetrakis(pentafluorophenyl)borate, methylditetradecylammonium tetrakis(pentafluorophenyl)borate, methyldioctadecylammonium tetrakis(pentafluorophenyl)borate, triethylammonium, tetrakis(pentafluorophenyl)borate, tripropylammoniumtetrakis(pentafluorophenyl)borate, tri(n-butyl)ammonium tetrakis(pentafluorophenyl)borate, tri(sec-butyl)ammoniumtetrakis(pentafluorophenyl)borate, N,N-dimethylanilium tetrakis(pentafluorophenyl)borate, N,N-diethylaniliumtetrakis(pentafluorophenyl)borate, N,N-dimethyl (2,4,6-trimethylanilium)tetrakis(pentafluorophenyl)borate, trimethylammoniumtetrakis(2,3,4,6-tetrafluorophenyl)borate, triethylammonium tetrakis(2,3,4,6-tetrafluorophenyl)borate, tripropylammonium tetrakis (2,3,4,6-tetrafluorophenyl)borate, tri(n-butyl)ammonium tetrakis(2,3,4,6-tetrafluorophenyl)borate, dimethyl(t-butyl) ammonium tetrakis(2,3,4,6-tetrafluorophenyl)borate, N,N-dimethylanilium tetrakis(2,3,4,6-tetrafluorophenyl)borate, N,N-diethylanilium tetrakis(2,3,4,6-tetrafluorophenyl)borate, and N,N-dimethyl-(2,4,6-trimethylanilium)tetrakis-(2,3,4,6-tetrafluorophenyl)borate; a dialkylammonium salt type borate-based compound such as dioctadecylammonium tetrakis(pentafluorophenyl)borate, ditetradecylammonium tetrakis(pentafluorophenyl)borate, and dicyclohexylammonium tetrakis(pentafluorophenyl)borate; or a trisubstituted phosphonium salt type borate-based compound such as triphenylphosphonium tetrakis(pentafluorophenyl)borate, methyldioctadecylphosphonium tetrakis(pentafluorophenyl)borate, and tri(2,6-dimethylphenyl)phosphoniumtetrakis(pentafluorophenyl)borate.

By using such a promoter, the molecular weight distribution of a finally prepared ethylene/alpha-olefin copolymer may become more uniform, and polymerization activity may be improved.

The promoter may be used in an appropriate amount so that the activation of the transition metal compound of Formula 1 may be sufficiently proceeded.

In addition, the catalyst composition may include the transition metal compound of Formula 1 in a supported state on a support.

If the transition metal compound of Formula 1 is supported on a support, the weight ratio of the transition metal compound to the support may be 1:10 to 1:1,000, more preferably, 1:10 to 1:500. If the support and the transition metal compound are included in the weight ratio range, an optimized shape may be shown. In addition, if the promoter is supported together on the support, the weight ratio of the promoter to the support may be 1:1 to 1:100, more preferably, 1:1 to 1:50. If the promoter and the support are included in the weight ratio, catalyst activity may be improved, and the minute structure of the polymer thus prepared may be optimized.

Meanwhile, the support may use silica, alumina, magnesia or a mixture thereof, or these materials may be used after removing moisture from the surface by drying at a high temperature, in a state where a hydroxyl group or a siloxane group, which have high reactivity, are included. In addition, the support dried at a high temperature may further include an oxide, a carbonate, a sulfate, or a nitrate component, such as $Na_2O$, $K_2CO_3$, $BaSO_4$ and $Mg(NO_3)_2$.

The drying temperature of the support is preferably, from 200 to 800° C., more preferably, from 300 to 600° C., most preferably, from 300 to 400° C. If the drying temperature of the support is less than 200° C., humidity is too high and water at the surface may react with the promoter, and if the temperature is greater than 800° C., the pores at the surface of the support may be combined to decrease the surface area, and a large amount of the hydroxyl groups at the surface may be removed to remain only siloxane groups to decrease reaction sites with the promoter, undesirably.

In addition, the amount of the hydroxyl group at the surface of the support may preferably be 0.1 to 10 mmol/g, and more preferably, 0.5 to 5 mmol/g. The amount of the hydroxyl group at the surface of the support may be controlled by the preparation method and conditions of the support, or drying conditions such as temperature, time, vacuum and spray drying.

Meanwhile, the polymerization reaction of the ethylene/alpha-olefin copolymer may be performed by continuously injecting hydrogen and continuously polymerizing ethylene and an alpha-olefin-based monomer in the presence of the catalyst composition.

In this case, the hydrogen gas restrains the rapid reaction of the transition metal compound at an initial stage of polymerization and plays the role of terminating polymerization reaction. Accordingly, by the use of such hydrogen gas and the control of the amount thereof used, an ethylene/alpha-olefin copolymer having narrow molecular weight distribution with an ultra low molecular weight may be effectively prepared.

The hydrogen gas may be injected in 45 to 100 cc/min, more particularly, 50 to 95 cc/min. If the hydrogen gas is injected under the above-described conditions, the ethylene/alpha-olefin polymer thus prepared may accomplish the physical properties in the present invention. If the hydrogen gas is injected in an amount less than 45 cc/min, the termination of the polymerization reaction may not homogeneously carried out, and the preparation of an ethylene/alpha-olefin copolymer having desired physical properties may become difficult, and if the amount is greater than 100 cc/min, the terminating reaction may arise excessively fast, and it is apprehended that an ethylene/alpha-olefin copolymer having an excessively small molecular weight may be prepared.

In addition, the polymerization reaction may be performed at 80 to 200° C., but by controlling the injection amount of the hydrogen together with the polymerization temperature, the number of unsaturated functional groups in the ethylene/alpha-olefin copolymer may be controlled even more advantageously. Accordingly, particularly, the polymerization reaction may be carried out at 100 to 150° C., more particularly, 100 to 140° C.

In addition, during the polymerization reaction, an organoaluminum compound is further injected to remove moisture in a reactor, and the polymerization reaction may be performed in the presence of the compound. Particular examples of such organoaluminum compound may include trialkyl aluminum, dialkyl aluminum halide, alkyl aluminum dihalide, aluminum dialkyl hydride or alkyl aluminum sesquihalide, etc., and more particular examples may include $Al(C_2H_5)_3$, $Al(C_2H_5)_2H$, $Al(C_3H_7)_3$, $Al(C_3H_7)_2H$, $Al(i-C_4H_9)_2H$, $Al(C_8H_{17})_3$, $Al(C_{12}H_{25})_3$, $Al(C_2H_5)(C_{12}H_{25})_2$, $Al(i-C_4H_9)(C_{12}H_{25})_2$, $Al(i-C_4H_9)_2H$, $Al(i-C_4H_9)_3$, $(C_2H_5)_2AlCl$, $(i-C_3H_9)_2AlCl$ or $(C_2H_5)_3Al_2Cl_3$. Such an organoaluminum compound may be continuously injected into the reactor, and for appropriate removal of humidity, the organoaluminum compound may be injected in a ratio of about 0.1 to 10 mole per 1 kg of a reaction medium injected into the reactor.

In addition, a polymerization pressure may be about 1 to about 100 $Kgf/cm^2$, preferably, about 1 to about 50 $Kgf/cm^2$, more preferably, about 5 to about 30 $Kgf/cm^2$.

In addition, if the transition metal compound is used in a supported state on a support, the transition metal compound may be injected after being dissolved or diluted in an aliphatic hydrocarbon solvent of 5 to 12 carbon atoms, for example, pentane, hexane, heptane, nonane, decane, and isomers thereof, an aromatic hydrocarbon solvent such as toluene and benzene, a chlorine atom-substituted hydrocarbon solvent such as dichloromethane and chlorobenzene, etc. The solvent used herein is preferably used after removing a small amount of water or air, which acts as a catalyst poison, by treating with a small amount of alkyl aluminum, and a promoter may be further used.

The ethylene/alpha-olefin copolymer prepared by the above-described preparation method has narrow molecular weight distribution together with an ultra low molecular weight, and at the same time, the vinyl content in a polymer may be minimized, and $R_{vd}$ satisfies the conditions of 0.5 or less. Accordingly, excellent physical properties, particularly, excellent stability at a high temperature may be shown, and an adhesive composition of the present invention, including the same may show excellent long-period properties together with excellent adhesive properties.

(3) Additional Components of Adhesive Composition

The adhesive composition of the present invention may further include a tackifier in addition to the ethylene/alpha-olefin copolymer.

The tackifier may be an aliphatic hydrocarbon resin, for example, may be selected from a modified C5 hydrocarbon resin (C5/C9 resin), a styrenated teflon resin, a totally or partially hydrogenated C9 hydrocarbon resin, a hydrogenated alicyclic hydrocarbon resin, a hydrogenated aromatic modified alicyclic hydrocarbon resin and a mixture thereof.

The tackifier may be included in 5 parts by weight to 70 parts by weight with respect to 100 parts by weight of the adhesive composition, without specific limitation, and may particularly be included in 20 parts by weight to 70 parts by weight. If the tackifier is included in less than 5 parts by weight, the viscosity of the adhesive composition may increase and processability may be degraded, and if the amount is greater than 70 parts by weight, heat resistance may be deteriorated.

The ethylene/alpha-olefin copolymer may be included in 10 parts by weight to 50 parts by weight, particularly, 15 parts by weight to 30 parts by weight with respect to 100 parts by weight of the adhesive composition. If the above numerical range is satisfied, excellent adhesive properties may be maintained.

In addition, the adhesive composition may further include a plasticizer. The plasticizer is not specifically limited, but may be a paraffinic or naphthenic plasticized oil. Particularly, a low molecular weight polymer such as an olefin oligomer, liquid polybutene, polyisoprene copolymer, liquid styrene-isoprene copolymer and liquid hydrogenated styrene-conjugated diene copolymer, vegetable oil and its derivative, or microcrystalline wax, may be used.

The plasticizer may be included in 10 parts by weight to 50 parts by weight, particularly, 20 parts by weight to 40 parts by weight with respect to 100 parts by weight of the adhesive composition, without specific limitation. If the plasticizer is included in less than 10 parts by weight, the viscosity of the adhesive composition may increase to deteriorate processability, and if the amount is greater than 50 parts by weight, adhesive properties may be degraded.

In addition, the adhesive composition may further include an antioxidant for increasing heat resistance and for improving color sense.

In this case, the antioxidant may use commonly known antioxidants in the art without specific limitation, and may be included in 0.01 parts by weight to 5 parts by weight, or 0.01 parts by weight to 1 part by weight, or 0.05 parts by weight to 0.75 parts by weight with respect to 100 parts by weight of the adhesive composition.

In addition, the adhesive composition may further include one or more additives selected from the group consisting of a UV stabilizer, a colorant or pigment, a filler, a fluidization aid, a coupling agent, a crosslinking agent, a surfactant, a solvent and the combination thereof.

The filler may be selected from sand, talc, dolomite, calcium carbonate, clay, silica, mica, wollastonite, feldspar, aluminum silicate, alumina, hydrated alumina, glass bead, glass microsphere, ceramic microsphere, thermoplastic microsphere, barite, wood flour, or the combination thereof, and the filler may be present in an amount of 80 wt % or less of the total composition.

An embodiment of the present invention provides an article including a substrate coated with the adhesive composition. The article may be selected from a tape, a label, a transfer paper, a box, a board, a tray, a medical device, a bandage, and a hygiene product, without limitation.

MODE FOR CARRYING OUT THE INVENTION

Examples

Hereinafter, preferred embodiments will be suggested to assist the understanding of the present invention.

However, the embodiments are provided only for easy understanding of the present invention, and the contents of the present invention is not limited thereto.

Synthetic Example: Preparation of Transition Metal Compound

Step 1: Preparation of Ligand Compound (1a-1)

To a 250 mL schlenk flask, 10 g (1.0 eq, 49.925 mmol) of 1,2-dimethyl-3H-benzo[b]cyclopenta[d]thiophene and 100 mL of THF were put, and 22 mL (1.1 eq, 54.918 mmol, 2.5 M in hexane) of n-BuLi was added thereto dropwisely at −30° C., followed by stirring at room temperature for 3 hours. A stirred Li-complex THF solution was cannulated into a schlenk flask containing 8.1 mL (1.0 eq, 49.925 mmol) of dichloro(methyl) (phenyl)silane and 70 mL of THF at −78° C., followed by stirring at room temperature overnight. After stirring, drying in vacuum was carried out and extraction with 100 ml of hexane was carried out.

To 100 ml of an extracted chloro-1-(1,2-dimethyl-3H-benzo[b]cyclopenta[d]thiophene-3-yl)-1,1-(methyl) (phenyl)silane hexane solution, 42 mL (8 eq, 399.4 mmol) of t-BuNH$_2$ was injected at room temperature, followed by stirring at room temperature overnight. After stirring, drying in vacuum was carried out and extraction with 150 ml of hexane was carried out. After drying the solvents, 13.36 g (68%, dr=1:1) of a yellow solid was obtained.

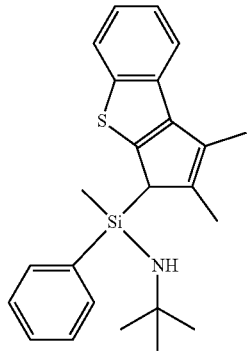

(1a-1)

$^1$H NMR (CDCl$_3$, 500 MHz): δ 7.93 (t, 2H), 7.79 (d, 1H), 7.71 (d, 1H), 7.60 (d, 2H), 7.48 (d, 2H), 7.40-7.10 (m, 10H, aromatic), 3.62 (s, 1H), 3.60 (s, 1H), 2.28 (s, 6H), 2.09 (s, 3H), 1.76 (s, 3H), 1.12 (s, 18H), 0.23 (s, 3H), 0.13 (s, 3H)

Step 2: Preparation of Transition Metal Compound (1a)

To a 100 mL schlenk flask, 4.93 g (12.575 mmol, 1.0 eq) of a ligand compound of Formula 1a-1 and 50 mL (0.2 M) of toluene were put and 10.3 mL (25.779 mmol, 2.05 eq, 2.5 M in hexane) of n-BuLi was added thereto dropwisely at −30° C., followed by stirring at room temperature overnight. After stirring, 12.6 mL (37.725 mmol, 3.0 eq, 3.0 M in diethyl ether) of MeMgBr was added thereto dropwisely, 13.2 mL (13.204 mmol, 1.05 eq, 1.0 M in toluene) of TiCl$_4$ was put in order, followed by stirring at room temperature overnight. After stirring, drying in vacuum and extraction with 150 mL of hexane were carried out, the solvents were removed to 50 mL, and 4 mL (37.725 mmol, 3.0 eq) of DME was added dropwisely, followed by stirring at room temperature overnight. Again, drying in vacuum and extraction with 150 mL of hexane were carried out. After drying the solvents, 2.23 g (38%, dr=1:0.5) of a brown solid was obtained.

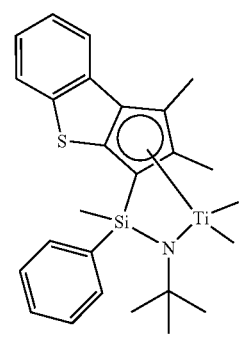

(1a)

$^1$H NMR (CDCl$_3$, 500 MHz): δ 7.98 (d, 1H), 7.94 (d, 1H), 7.71 (t, 6H), 7.50-7.30 (10H), 2.66 (s, 3H), 2.61 (s, 3H), 2.15

(s, 3H), 1.62 (s, 9H), 1.56 (s, 9H), 1.53 (s, 3H), 0.93 (s, 3H), 0.31 (s, 3H), 0.58 (s, 3H), 0.51 (s, 3H), −0.26 (s, 3H), −0.39 (s, 3H)

Preparation of Ethylene/Alpha-Olefin Copolymer

Preparation Example 1

Into a 1.5 L autoclave continuous process reactor, a hexane solvent (5.0 kg/h) and 1-octene (1.00 kg/h) were charged, and the top of the reactor was pre-heated to a temperature of 150° C. A triisobutylaluminum compound (0.05 mmol/min), the transition metal compound (1a) (0.40 μmol/min) prepared in the Synthetic Example as a catalyst, and a dimethylanilium tetrakis(pentafluorophenyl) borate promoter (1.20 μmol/min) were injected into the reactor at the same time. Then, into the autoclave reactor, ethylene (0.87 kg/h) and a hydrogen gas (50 cc/min) were injected and copolymerization reaction was continuously carried out while maintaining a pressure of 89 bar and a polymerization temperature of 125° C. for 60 minutes or more to prepare a copolymer.

Then, a remaining ethylene gas was exhausted out and the copolymer-containing solution thus obtained was dried in a vacuum oven for 12 hours or more. The physical properties of the copolymer thus obtained were measured.

Preparation Examples 2 to 5 and Comparative Preparation Examples 1 to 7

Polymers were prepared by carrying out the same method as in Preparation Example 1 except that the reactant materials were injected in amounts listed in Table 1 below.

TABLE 1

| | Catalyst injection amount (μmol/min) | Promoter injection amount (μmol/min) | 1-C8 injection amount (kg/h) | TiBAl (mmol/min) | Polymerization temperature (° C.) | H$_2$ injection amount (cc/min) |
|---|---|---|---|---|---|---|
| Preparation Example 1 | 0.40 | 1.20 | 1.00 | 0.05 | 125 | 50 |
| Preparation Example 2 | 0.40 | 1.20 | 1.00 | 0.05 | 125 | 75 |
| Preparation Example 3 | 0.40 | 1.20 | 1.00 | 0.05 | 125 | 80 |
| Preparation Example 4 | 0.40 | 1.20 | 1.00 | 0.05 | 125 | 95 |
| Preparation Example 5 | 0.20 | 0.60 | 1.10 | 0.05 | 125 | 85 |
| Comparative Preparation Example 1 | 0.70 | 2.10 | 2.00 | 0.05 | 150 | 0 |
| Comparative Preparation Example 2 | 0.40 | 1.20 | 1.00 | 0.05 | 125 | 0 |
| Comparative Preparation Example 3 | 0.40 | 1.20 | 1.00 | 0.05 | 125 | 10 |
| Comparative Preparation Example 4 | 0.40 | 1.20 | 1.00 | 0.05 | 125 | 15 |
| Comparative Preparation Example 5 | 0.40 | 1.20 | 1.00 | 0.05 | 125 | 130 |
| Comparative Preparation Example 6 | 0.26 | 0.78 | 1.20 | 0.05 | 125 | 35 |
| Comparative Preparation Example 7 | 0.65 | 1.95 | 2.20 | 0.05 | 160 | 0 |

* In Comparative Preparation Examples 6 and 7, [Me$_2$Si(Me$_4$C$_5$)NtBu]Ti(CH$_3$)$_2$ was used as a catalyst.

With respect to the ethylene/alpha-olefin copolymers prepared in the Preparation Examples and the Comparative Preparation Examples, physical properties were measured according to the methods described below and are shown in Table 2.

1) Density (g/cm$^3$): measured according to ASTM D-792.

2) Viscosity (cP): measured using a Brookfield RVDV3T viscometer and according to the method described below. In detail, 13 ml of a specimen was put in a specimen chamber and heated to 180° C. using Brookfield Thermosel. After the specimen was completely dissolved, a viscometer equipment was lowered to fix a spindle to the specimen chamber, the rotation speed of the spindle (SC-29 high temperature-melt spindle) was fixed to 20 rpm, and viscosity values were deciphered for 20 minutes or more, or until the value was stabilized, and a final value was recorded.

3) Viscosity change rate (%): measured using a Brookfield RVDV3T viscometer and according to the method described below. In detail, 13 ml of a specimen was put in a specimen chamber and heated to 180° C. using Brookfield Thermosel. After the specimen was completely dissolved, a viscometer equipment was lowered to fix a spindle to the specimen chamber, the rotation speed of the spindle (SC-29 high temperature-melt spindle) was fixed to 20 rpm, and viscosity values were recorded once per hour for 72 hours. A difference between an initial viscosity and a viscosity after 72 hours was converted into a percentage, and the viscosity change rate was calculated.

For reference, the viscosity was too high or too low in Comparative Preparation Examples 1 to 5, and the measurement of the viscosity change rate using SC-29 high temperature-melt spindle (5000-450000 cP) was impossible.

4) Melting temperature (Tm, ° C.): The melting temperature of a polymer was measured using a differential scanning calorimeter (DSC, apparatus name: DSC 2920, manufacturer: TA instrument). Particularly, the polymer was heated to 150° C., kept for 5 minutes, and cooled to −100° C., and then, the temperature was elevated again. In this case, the elevating rate and decreasing rate of the temperature were controlled to 10° C./min, respectively. The maximum point of an endothermic peak measured in a second elevating section of the temperature was set to the melting temperature.

5) Crystallization temperature (Tc, ° C.): performed by the same method as that for measuring the melting temperature using DSC. From a curve represented while decreasing the temperature, the maximum point of an exothermic peak was set to crystallization temperature.

6) Weight average molecular weight (g/mol) and molecular weight distribution (MWD): a number average molecular weight (Mn) and a weight average molecular weight (Mw) were measured, respectively, by gel permeation chromatography (GPC, PL GPC220) under the conditions below, and molecular weight distribution was calculated through dividing the weight average molecular weight by the number average molecular weight:

Column: PL Olexis
Solvent: trichlorobenzene (TCB)
Flow rate: 1.0 ml/min
Specimen concentration: 1.0 mg/ml
Injection amount: 200 µl
Column temperature: 160° C.
Detector: Agilent High Temperature RI detector
Standard: Polystyrene (calibrated by cubic function)

7) Total number of unsaturated functional groups (per 1000 C): the numbers of vinyl, vinylene, and vinylidene per 1000 carbon atoms were measured from the NMR analysis results.

In detail, first, in order to remove remaining 1-octene which may be present in a specimen, the polymer was prepared by reprecipitation prior to conducting NMR analysis. In detail, 1 g of the polymer was completely dissolved in chloroform of 70° C., and the polymer solution thus obtained was slowly poured into 300 ml of methanol while stirring to reprecipitate the polymer. The reprecipitated polymer was dried in vacuum at room temperature. The above-described process was repeated once more to obtain a polymer from which remaining 1-octene was removed.

30 mg of the specimen of the polymer obtained above was dissolved in 1 ml of a chloroform-d (w/TMS) solution. Measurement was performed 16 times at room temperature with an acquisition time of 2 seconds and a pulse angle of 45°, using an Agilent 500 MHz NMR equipment. Then, the TMS peak in 1H NMR was calibrated to 0 ppm, a $CH_3$-related peak (triplet) of 1-octene at 0.88 ppm and a $CH_2$-related peak (broad singlet) of ethylene at 1.26 ppm were confirmed, respectively. An integration value of the $CH_3$ peak was calibrated to 3 to calculate the contents. The numbers of vinyl, vinylene and vinylidene could be calculated based on the integration values of each functional group in 4.5-6.0 ppm region. For reference, the viscosity of Comparative Example 6 below was too low viscosity, and was not measured.

8) $R_{vd}$: $R_{vd}$ value was calculated according to the following Mathematical Equation 1 from the numbers of vinyl, vinylene and vinylidene, measured through the NMR analysis:

$$R_{vd} = \frac{[\text{vinylidene}]}{[\text{vinyl}] + [\text{vinylene}] + [\text{vinylidene}]} \quad [\text{Mathematical Equation 1}]$$

(in Mathematical Equation 1, vinyl, vinylene and vinylidene mean the number of each functional group per 1000 carbon atoms, measured through nuclear magnetic spectroscopic analysis).

TABLE 2

| | Density (g/cc) | Tc/Tm (° C.) | Viscosity (cP) | Viscosity change rate (%) | Number of unsaturated functional groups (per 1000 C) | | | | $R_{vd}$ | Mw | Molecular weight distribution |
| | | | | | Total amount | vinyl | vinylene | vinylidene | | | |
| --- | --- | --- | --- | --- | --- | --- | --- | --- | --- | --- | --- |
| Preparation Example 1 | 0.873 | 50.6/66.5 | 35000 | 18 | 0.40 | 0.05 | 0.27 | 0.08 | 0.20 | 34900 | 1.98 |
| Preparation Example 2 | 0.875 | 52.0/68.1 | 17000 | 15 | 0.35 | 0.04 | 0.24 | 0.07 | 0.20 | 24400 | 1.96 |
| Preparation Example 3 | 0.876 | 52.3/68.9 | 13500 | 14 | 0.32 | 0.03 | 0.22 | 0.07 | 0.22 | 22400 | 1.98 |
| Preparation Example 4 | 0.877 | 53.2/69.7 | 8500 | 11 | 0.29 | 0.03 | 0.20 | 0.06 | 0.21 | 19500 | 1.77 |
| Preparation Example 5 | 0.875 | 52.2/68.3 | 17000 | 12 | 0.30 | 0.02 | 0.21 | 0.07 | 0.18 | 24500 | 1.96 |
| Comparative Preparation Example 1 | 0.872 | 49.7/66.0 | >50000 | N/A | 1.36 | 0.20 | 0.78 | 0.39 | 0.29 | 46800 | 2.14 |
| Comparative Preparation Example 2 | 0.874 | 51.5/67.6 | >50000 | N/A | 0.54 | 0.06 | 0.38 | 0.10 | 0.19 | 75400 | 2.08 |
| Comparative Preparation Example 3 | 0.874 | 51.3/67.8 | >50000 | N/A | 0.45 | 0.04 | 0.32 | 0.09 | 0.20 | 57700 | 2.09 |
| Comparative Preparation Example 4 | 0.873 | 50.5/66.3 | >50000 | N/A | 0.42 | 0.04 | 0.29 | 0.09 | 0.21 | 48700 | 2.08 |
| Comparative Preparation Example 5 | 0.879 | 55.7/72.7 | 3500 | N/A | 0.29 | — | — | — | — | 14600 | 1.97 |
| Comparative Preparation Example 6 | 0.876 | 56.1/73.2 | 13900 | 22 | 0.32 | 0.03 | 0.10 | 0.20 | 0.63 | 22800 | 1.94 |
| Comparative Preparation Example 7 | 0.875 | 55.3/73.1 | 15800 | 41 | 1.38 | 0.19 | 0.79 | 0.40 | 0.29 | 26700 | 2.24 |

In Table 2, "—" means not measured, and "N/A" means unmeasurable.

Preparation of Adhesive Composition

Example 1

An adhesive composition including 40 wt % of the copolymer of Preparation Example 2 as an ethylene/alpha-olefin copolymer, 40 wt % of SUKOREZ® SU-110S (Kolon Industries, Inc.) as a tackifier, and 20 wt % of SASOLWAX H₁ (SASOL) as a plasticizer, was prepared.

Examples 2 to 4 and Comparative Examples 1 to 4

Adhesive compositions were prepared according to the same method as in Example 1 except for changing the kinds and amounts of the ethylene/alpha-olefin copolymer, tackifier and plasticizer, as listed in Table 3 below.

TABLE 3

| | Ethylene/alpha-olefin copolymer | | | | tackifier | | plasticizer |
|---|---|---|---|---|---|---|---|
| | Preparation Example 2 | Preparation Example 3 | Comparative Preparation Example 6 | Comparative Preparation Example 7 | SU-100S | H-100W | SasolH1 |
| Example 1 | 40 | | | | 40 | | 20 |
| Example 2 | 40 | | | | | 40 | 20 |
| Example 3 | | 40 | | | 40 | | 20 |
| Example 4 | | 40 | | | | 40 | 20 |
| Comparative Example 1 | | | | 40 | 40 | | 20 |
| Comparative Example 2 | | | | 40 | | 40 | 20 |
| Comparative Example 3 | | | 40 | | 40 | | 20 |
| Comparative Example 4 | | | 40 | | | 40 | 20 |

* Eastotac H-100W (Eastman Chemical Company)

In case of Comparative Preparation Examples 1 to 4, the viscosity was too high, and in case of Comparative Preparation Example 5, the viscosity was too low, and the application to the adhesive composition of the present invention was difficult. Accordingly, by using the copolymers of Comparative Preparation Examples 6 and 7, which had a viscosity in a similar range as the copolymers of the Preparation Examples of the present invention, the adhesive compositions of Comparative Examples 1 to 4 were constituted.

Experimental Examples

Physical properties on the adhesive compositions of the Examples and the Comparative Examples were measured by the methods below, and are shown in Table 4.

1) Viscosity change rate (%): measured using a Brookfield RVDV3T viscometer and according to the method described below. In detail, 13 ml of a specimen was put in a specimen chamber and heated to 180° C. using Brookfield Thermosel. After the specimen was completely dissolved, a viscometer equipment was lowered to fix a spindle to the specimen chamber, the rotation speed of the spindle (SC-29 high temperature-melt spindle) was fixed to 20 rpm, and viscosity values were recorded once per hour for 144 hours. A difference between an initial viscosity and a viscosity after 144 hours was converted into a percentage, and the viscosity change rate was calculated.

2) Heat resistant discoloration (YI): measured using a forced convection oven by JEIO TECH (OF-22) according to the method below. In detail, 100 g of an adhesive composition which was prepared after cut within 2.5 mm×2.5 mm, was weighed. The specimen thus weighed was put in a 250 ml, heat resistant beaker and heated at 140° C. in a vacuum oven three or four times for 10 to 20 minutes to remove remaining bubbles. The mouth of the beaker was sealed with an aluminum foil, the temperature of a convection oven was set to 180° C., and the beaker was continuously heated for 72 hours. Then, a specimen was formed into a thickness of 2 mm and a YI value was measured. YI used was an average value after measuring three or more different points of the specimen.

TABLE 4

| | Viscosity change rate (%) | Heat resistant discoloration (YI) |
|---|---|---|
| Example 1 | 9 | 59 |
| Example 2 | 9 | 46 |
| Example 3 | 8 | 61 |
| Example 4 | 9 | 45 |
| Comparative Example 1 | 17 | 76 |
| Comparative Example 2 | 18 | 54 |
| Comparative Example 3 | 13 | 67 |
| Comparative Example 4 | 13 | 48 |

Referring to Table 4, a case of the adhesive composition according to the present invention showed a little viscosity change according to time and excellent long-period properties. In addition, discoloration degree was a little even after standing for a long time at a high temperature, and it could be confirmed that stability at a high temperature was excellent.

Particularly, the adhesive composition of the present invention showed the viscosity change rate of less than 10% after 144 hours, which was markedly lower than the Comparative Examples.

In addition, in the adhesive composition of the present invention when compared with the Comparative Examples using the same tackifier, it was confirmed that Examples 1 and 3 showed less heat resistant discoloration degree when compared with Comparative Examples 1 and 3, and Examples 2 and 4 showed less heat resistant discoloration degree when compared with Comparative Examples 2 and 4. Accordingly, it could be confirmed that the adhesive composition of the present invention has stability at a high temperature.

As described above, since the adhesive composition of the present invention includes an ethylene/alpha-olefin copolymer having total number of unsaturated functional groups per 1,000 carbon atoms of 0.8 or less, a $R_{vd}$ value of 0.5 or less, and a small amount ratio of vinylidene, viscosity change rate according to time is insignificant and excellent long-period properties may be shown, and also, stability at a high temperature may be improved.

The invention claimed is:

1. An adhesive composition comprising an ethylene/alpha-olefin copolymer; and a tackifier,
   wherein the ethylene/alpha-olefin copolymer satisfies the following conditions i) to iv):
   i) a viscosity: 6,000 cP to 40,000 cP, when measured at a temperature of 180° C.,
   ii) a molecular weight distribution (MWD): 1.5 to 3.0,
   iii) a total number of unsaturated functional groups per 1000 carbon atoms: 0.8 or less, and
   iv) a $R_{vd}$ value according to the following Mathematical Equation 1: 0.3 or less:

$$R_{vd} = \frac{[\text{vinylidene}]}{[\text{vinyl}] + [\text{vinylene}] + [\text{vinylidene}]} \quad [\text{Mathematical Equation 1}]$$

in Mathematical Equation 1, the vinyl, vinylene and vinylidene mean the number of each functional group per 1000 carbon atoms, measured through nuclear magnetic spectroscopic analysis.

2. The adhesive composition according to claim 1, wherein the ethylene/alpha-olefin copolymer has a density of 0.85 to 0.89 g/cc, measured according to ASTM D-792.

3. The adhesive composition according to claim 1, wherein the ethylene/alpha-olefin copolymer has a weight average molecular weight (Mw) of 17,000 to 40,000 g/mol.

4. The adhesive composition according to claim 1, wherein the viscosity is 8,500 to 35,000 cP, when measured at a temperature of 180° C.

5. The adhesive composition according to claim 1, wherein the alpha-olefin comprises one or more selected from propylene, 1-butene, 1-pentene, 4-methyl-1-pentene, 1-hexene, 1-heptene, 1-octene, 1-decene, 1-undecene, 1-dodecene, 1-tetradecene, 1-hexadecene, or 1-eicocene.

6. The adhesive composition according to claim 1, wherein the alpha-olefin is comprised in an amount of from greater than 0 to 99 mol % or less with respect to a total weight of the ethylene/alpha-olefin copolymer.

7. The adhesive composition according to claim 1, wherein the ethylene/alpha-olefin copolymer further satisfies the following conditions v) to vii):
   v) a density: 0.85 to 0.89 g/cc, measured according to ASTM D-792,
   vi) a number average molecular weight (Mn): 9,000 to 25,000, and
   vii) a melt index (MI) at 190° C., 2.16 kg load by ASTM D1238: 200 to 1,300 dg/min.

8. The adhesive composition according to claim 1, wherein the tackifier is one or more selected from a modified C5 hydrocarbon resin, a styrenated teflon resin, a totally or partially hydrogenated C9 hydrocarbon resin, a hydrogenated alicyclic hydrocarbon resin, or a hydrogenated aromatic modified alicyclic hydrocarbon resin.

9. An article comprising a substrate coated with the adhesive composition according to claim 1.

10. The adhesive composition according to claim 1, wherein the ethylene/alpha-olefin copolymer has a crystallization temperature (Tc) of 45° C. to 60° C., and a melting temperature (Tm) of 60 to 80° C., wherein both the crystallization temperature and the melting temperature are measured by a differential scanning calorimetry (DSC).

11. The adhesive composition according to claim 1, wherein the tackifier is included in 5 parts by weight to 70 parts by weight with respect to 100 parts by weight of the adhesive composition, and the ethylene/alpha-olefin copolymer is included in 10 parts by weight to 50 parts by weight with respect to 100 parts by weight of the adhesive composition.

12. A method of preparing an ethylene/alpha-olefin copolymer, which satisfies the following conditions i) to iv):
   i) a viscosity: 6,000 cP to 40,000 cP, when measured at a temperature of 180° C.,
   ii) a molecular weight distribution (MWD): 1.5 to 3.0,
   iii) a total number of unsaturated functional groups per 1000 carbon atoms: 0.8 or less, and
   iv) a $R_{vd}$ value according to the following Mathematical Equation 1: 0.3 or less:

$$R_{vd} = \frac{[\text{vinylidene}]}{[\text{vinyl}] + [\text{vinylene}] + [\text{vinylidene}]} \quad [\text{Mathematical Equation 1}]$$

in Mathematical Equation 1, the vinyl, vinylene and vinylidene mean the number of each functional group per 1000 carbon atoms, measured through nuclear magnetic spectroscopic analysis,
   the method comprising a step of polymerizing ethylene and an alpha-olefin-based monomer by injecting hydrogen in 45 to 100 cc/min in the presence of a catalyst composition including a transition metal compound of Formula 1:

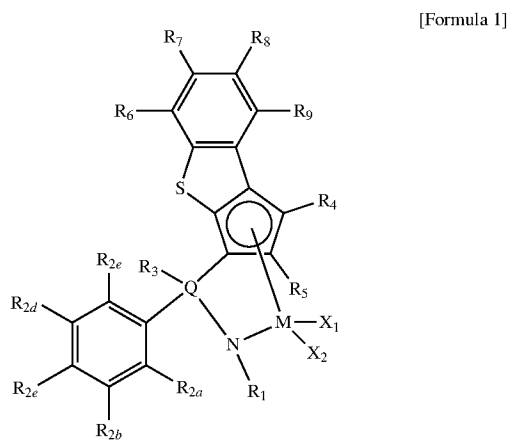

[Formula 1]

wherein,
$R_1$ is hydrogen; alkyl of 1 to 20 carbon atoms; cycloalkyl of 3 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms,
$R_{2a}$ to $R_{2e}$ are each independently hydrogen; halogen; alkyl of 1 to 20 carbon atoms; cycloalkyl of 3 to 20 carbon atoms; alkenyl of 2 to 20 carbon atoms; alkoxy of 1 to 20 carbon atoms; or aryl of 6 to 20 carbon atoms, $R_3$ is hydrogen; halogen; alkyl of 1 to 20 carbon atoms; cycloalkyl of 3 to 20 carbon atoms; alkenyl of 2 to 20 carbon atoms; aryl of 6 to 20 carbon atoms; alkylaryl of 6 to 20 carbon atoms; arylalkyl of 7 to 20 carbon atoms; alkyl amido of 1 to 20 carbon atoms; aryl amido of 6 to 20 carbon atoms; or phenyl which is substituted with one or more selected from the group consisting of halogen, alkyl of 1 to 20 carbon atoms, cycloalkyl of 3 to 20 carbon atoms, alkenyl of 2 to 20 carbon atoms, alkoxy of 1 to 20 carbon atoms and aryl of 6 to 20 carbon atoms, $R_4$ to $R_9$ are each independently hydrogen; silyl; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; or a metalloid radical of a metal in group 14, which is substituted with hydrocarbyl of 1 to 20 carbon atoms; where among the $R_6$ to $R_9$, adjacent two or more are optionally connected with each other to form a ring, Q is Si or C, M is a transition metal in group 4, and $X_1$ and $X_2$ are each independently hydrogen; halogen; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkylamino of 1 to 20 carbon atoms; or arylamino of 6 to 20 carbon atoms.

13. The method of preparing the ethylene/alpha-olefin copolymer according to claim 12, wherein the compound of Formula 1 comprises a compound represented by any one among the structures below:

[Formula 1-1]

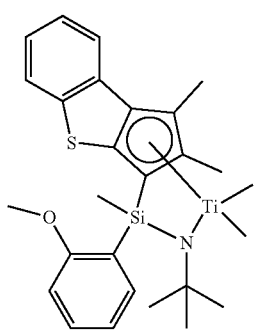

[Formula 1-2]

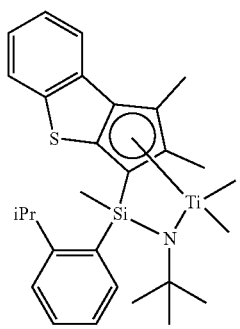

[Formula 1-3]

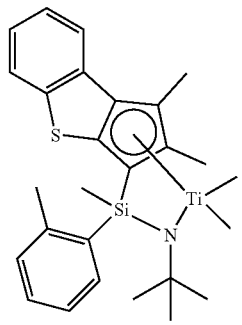

[Formula 1-4]

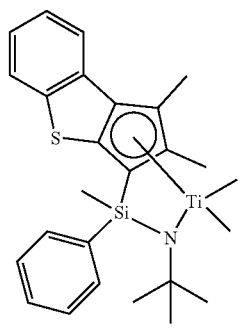

[Formula 1-5]

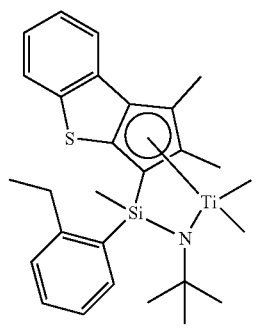

[Formula 1-6]

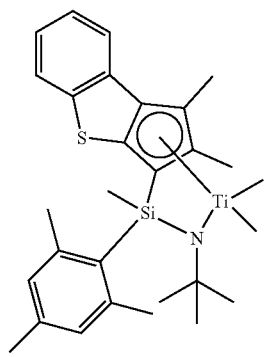

[Formula 1-7]

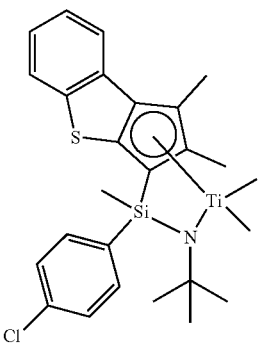

[Formula 1-8]

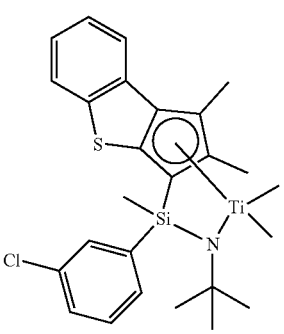

[Formula 1-9]

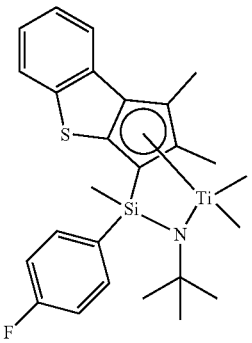

[Formula 1-10]

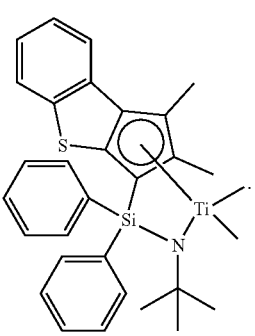

14. The method of preparing the ethylene/alpha-olefin copolymer according to claim 12, wherein the catalyst composition further comprises a promoter for activating the transition metal compound of Formula 1.

15. The method of preparing the ethylene/alpha-olefin copolymer according to claim 14, wherein the promotor comprises an organometal compound including a metal in group 13.

16. The method of preparing the ethylene/alpha-olefin copolymer according to claim 14, wherein the promotor comprises one or more selected from a compound of the following Formula 2, a compound of the following Formula 3, or a compound of the following Formula 4:

$$R_{41}-[Al(R_{42})-O]_n-R_{43} \quad \text{[Formula 2]}$$

in Formula 2, $R_{41}$, $R_{42}$ and $R_{43}$ are each independently any one selected from hydrogen, halogen, a hydrocarbyl group of 1 to 20 carbon atoms, or a halogen-substituted hydrocarbyl group of 1 to 20 carbon atoms, and n is an integer of 2 or more, $$D(R_{44})_3 \quad \text{[Formula 3]}$$

in Formula 3, D is aluminum or boron, and each $R_{44}$ is each independently any one selected from halogen, a hydrocarbyl group of 1 to 20 carbon atoms, or a halogen-substituted hydrocarbyl group of 1 to 20 carbon atoms, $$[L-H]^+[Z(A)_4]^- \text{ or } [L]^+[Z(A)_4]^- \quad \text{[Formula 4]}$$

in Formula 4, L is a neutral Lewis base or Brønsted base, H is a hydrogen atom, $[L]^+$ is a cationic Lewis acid, $[L-H]^+$ is a cationic Brønsted acid, Z is an element in group 13, and A is each independently a hydrocarbyl group of 1 to 20 carbon atoms, or a hydrocarbyloxy group of 1 to 20 carbon atoms, wherein the hydrocarbyl group or the hydrocarbyloxy group is unsubstituted or substituted with one or more substituents selected from halogen, a hydrocarbyloxy group of 1 to 20 carbon atoms, or a hydrocarbylsilyl group of 1 to 20 carbon atoms.

17. The method of preparing the ethylene/alpha-olefin copolymer according to claim 12, wherein the transitional metal compound of Formula 1 is in a supported state on a support, and a weight ratio of the transitional metal compound of Formula 1 to the support is 1:10 to 1:1,000.

18. The method of preparing the ethylene/alpha-olefin copolymer according to claim 17, wherein the support is silica, alumina, magnesia or a mixture thereof.

19. The method of preparing the ethylene/alpha-olefin copolymer according to claim 12, wherein the polymerization is performed at 80° C. to 200° C., and under a pressure of about 1 to about 100 kgf/cm².

\* \* \* \* \*